United States Patent [19]
Luteran

[11] 3,943,897
[45] Mar. 16, 1976

[54] IGNITION SYSTEM FOR ROTARY PISTON ENGINE

[76] Inventor: Frank Kenneth Luteran, 10 Charles St., Auburn, N.Y. 13021

[22] Filed: Oct. 2, 1974

[21] Appl. No.: 511,448

[52] U.S. Cl. .......................... 123/8.09; 123/146.5 A
[51] Int. Cl.² ......................................... F02B 53/12
[58] Field of Search ........ 123/8.09, 117 R, 146.5 A, 123/148 E, 148 MC

[56] References Cited
UNITED STATES PATENTS

| | | | |
|---|---|---|---|
| 3,521,611 | 7/1970 | Finch | 123/146.5 A |
| 3,673,999 | 7/1972 | Lacy et al. | 123/148 E X |
| 3,867,916 | 2/1975 | Bigalke | 123/148 E X |

FOREIGN PATENTS OR APPLICATIONS 1,805,042  5/1970  Germany .......................... 123/8.09

Primary Examiner—Carlton R. Croyle
Assistant Examiner—Michael Koczo, Jr.

[57] ABSTRACT

An ignition system for a rotary piston engine uses the position of the rotary piston to generate the ignition timing pulse. A sensor is mounted in the wall of the epitrochoidal housing at a point opposite a rotor apex seal when the piston is at the maximum advance position. The timing signal is delayed by appropriate circuits and triggers high voltage generating circuits that provide igniting voltages to the trailing and leading ignition plugs at the proper time.

10 Claims, 3 Drawing Figures

3,943,897

IGNITION SYSTEM FOR ROTARY PISTON ENGINE

BACKGROUND OF THE INVENTION

The present invention relates to an ignition system for rotary piston engines in which the timing signal is generated by the position of the rotor apex seals. The timing signals are processed by electronic circuits to provide the proper timing delays to the high voltage generating means connected to the leading and trailing spark plugs.

Prior art ignition systems for rotary piston engines utilize a distributor timing mechanism driven from the crankshaft and operating in essentially the same manner as the distributors in reciprocating piston engines. U.S. Pat. No. 3,554,092 illustrates the operation of the mechanical distributor universally used in present day rotary piston engines. The mechanical distributor has the wear shortcomings of any mechanical system with the accuracy of the timing function gradually decreasing as the distributor gearing wears. Also, the higher rotational speeds of the rotary engine produce higher noise levels in the mechanical distributor systems. The higher engine RPM's also limit the usefulness of breaker points in the distributor since higher spring tension must be applied to keep the points from floating at the high RPM. This higher tension results in greater rubbing block wear and shorter point life.

SUMMARY OF THE INVENTION

The present invention provides a rotary piston engine ignition system which overcomes the above described disadvantages.

Accordingly, an essential object of the present invention is to provide an ignition system for use in a rotary engine in which the timing signal is derived directly from the position of the rotary piston.

Another object of the ignition invention is to provide a timing and ignition distribution system that does not require any rotating components.

A further object of the rotary ignition invention is to provide an ignition system that is capable of operating at high engine RPM's.

Still a further object of the invention is to provide an ignition system that provides a highly accurate timing pulse.

Yet a further object of the invention is to provide separate ignition timing for the trailing and leading spark plugs.

And yet another object of the invention is to provide an ignition system in which the timing can be electronically controlled to provide best engine performance at lowest emission levels.

DESCRIPTION OF THE PREFERRED EMBODIMENT

Figure 1:
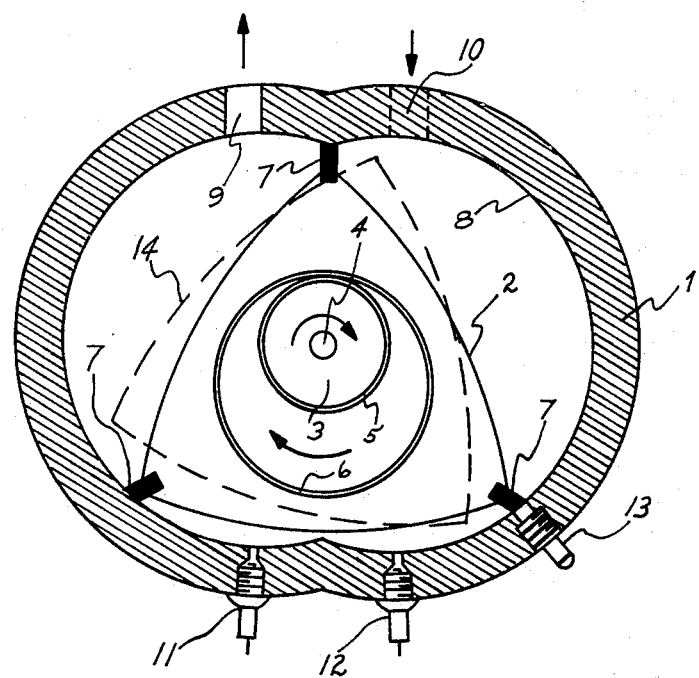
FIG. 1 is a cross sectional view of the combustion chamber of a rotary piston engine showing the timing sensor placement.

In FIG. 1 the rotary piston internal combustion engine comprises a housing 1 having an epitrochoid shaped inner wall 8. The housing further comprises end walls (not shown) within which crankshaft 4 is rotatably supported. A hub 3 with external gear teeth 5 is rigidly affixed to the end wall. A triangle shaped rotary piston 2 with internal gear teeth 6 on a portion of the inner surface is mounted for rotation about hub 3. An eccentric mounted on the crankshaft and slidingly contacting the non-geared portion of the inner surface of the rotary piston transmits torque to the crankshaft. The rotary piston 2 is provided with radially moving apex seals 7 which continuously sweep along inner wall 8 as the rotary piston 2 rotates. In the arrangement a plurality of working chambers are formed between the rotary piston 2 and the inner wall 8 each of which varies in volume as the rotary piston 2 undergoes each cycle of four strokes of intake, compression, power and exhaust.

The inner wall 8 is provided with suitably spaced intake and exhaust ports 10 and 9 and a pair of suitably spaced leading and trailing spark plugs 11 and 12. Timing sensor 13 is positioned in housing 1 opposite an apex seal when the rotary piston is in the maximum advanced position. Timing sensor 13 generates a timing pulse whenever apex seal 7 transverses the sensor area. Piston 2 is shown at the top dead center (TDC) point. Dashed-line piston 14 shows the position of rotary piston 2 at a later time in the combustion cycle.

The remaining structure of the rotary piston engine is well known to those skilled in the art and, therefore, the details thereof are omitted for the sake of brevity.

Figure 2:
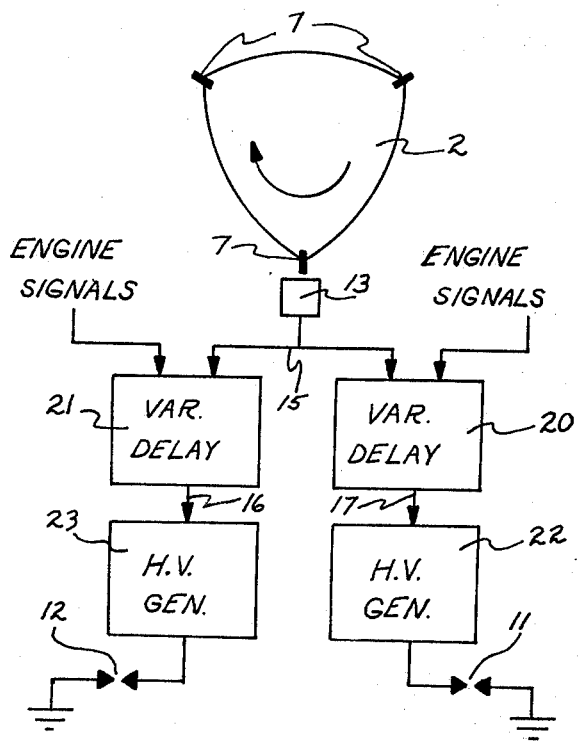
FIG. 2 is a block diagram showing the functional circuit blocks for one embodiment of the ignition system.

In FIG. 2 rotary piston 2, apex seals 7 and timing sensor 13 are shown in functional relationship. Timing pulse 15, generated when the apex seal 7 traverses timing sensor 13 is connected to variable time delay circuits 20 and 21. Engine signals such as r.p.m., manifold pressure, throttle position, choke valve position, and temperature are also fed to delay circuits 20 and 21 and modify the delay time to provide correctly timed ignition pulses 16 and 17. The ignition pulses actuate high voltage (H.V.) generators 23 and 22 which provide ignition sparks to trailing and leading spark plugs 12 and 11. Since ignition pulses 16 and 17 require different delays of the timing pulse, the engine signals to delays 21 and 20 are weighted differently in accordance with predetermined engine operating conditions and thereby produce different delay times. In normal operation leading spark plug 11 is ignited first and trailing spark plug 12 is ignited second. Since timing sensor 13 is positioned at the point where rotary piston 2 is positioned for maximum advanced timing, all timing signals other than at maximum advance require a delay prior to generating the ignition sparks.

Figure 3:
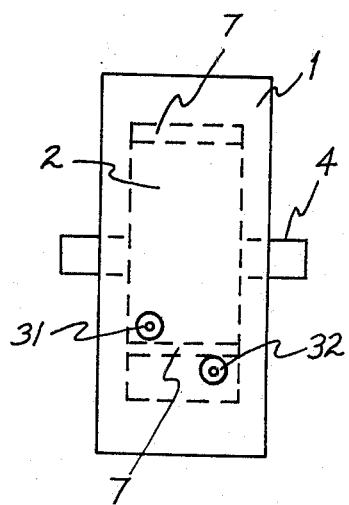
FIG. 3 is a side view of the combustion chamber showing the placement of a pair of timing sensors.

In FIG. 3 a sensor pair comprised of first sensor 31 and second sensor 32 are located in the wall of housing 1. The sensor pair produce a timing signal when apex seal 7 of rotary piston 2 passes between the sensors. The timing signal is further coupled to the circuits described in FIG. 2 to produce properly timed ignition sparks to the spark plugs. The utilization of a pair of sensors provides the capability for detecting the midpoint or null point between sensor outputs by utilizing the sensors in a bridge circuit arrangement. A bridge type circuit would have one sensor in each of the bridge arms and would produce a timing pulse signal when both sensor outputs were equal and not zero. This would occur when the apex seal was at the mechanical symmetry point between the sensors. By making the bridge arm gains unequal, an output timing pulse can be generated when the seal is at a point other than the symmetry point between the sensors. The sensor positioning and characteristics must be such that for all positions of the apex seal between the sensors, signals are generated in both sensors. Also, the detection point of the sensor pair can be electrically shifted about the physical midpoint to produce an exact apex seal sensor positioning.

In an operating system, many sensor types may be utilized. Where the housing is comprised of non-ferrous material, magnetic flux or inductive sensors in combination with a ferrous apex seal may be utilized to generate the timing pulse. In these applications the sensor body need not penetrate the chamber inner wall. The use of capacitance type sensors requires a projection of the sensor through the chamber wall with the active end of the sensor flush with the inner wall surface. Also, the apex seal may be constructed as a composite. The rubbing surface being of material having the necessary wear characteristics and the inner portion being of a material that will activate the sensor. Since it is possible to place the sensor at any of three points along the epitrochoidal surface to detect the apex seal position, the choice was made to place the sensor in the area where the temperature was the lowest. This point is located between the intake and compression chamber areas.

Although the present invention has been fully described by way of example with reference to the accompanying drawings, it is noted that various changes and modifications are apparent to those skilled in the art. For example, the H.V. generator may be an induction circuit, capacitor discharge or oscillator circuit of single or multiple ignition pulses. Such modifications are to be construed as included within the scope of the present invention.

I claim:
1. An ignition system for an internal combustion engine having a housing and a rotary piston comprising,
    a. apex seals attached to the rotary piston and contacting the housing wall,
    b. a timing sensor attached to the housing, detecting the position of the seals and producing a timing signal output when the seal is in alignment with the sensor,
    c. variable delay means for electrically delaying the timing signal and producing a delayed timing signal output,
    d. high voltage generating means activated by the delayed timing signal and producing a high voltage signal,
    e. spark plugs positioned in the combustion chamber, connected to the generating means and producing ignition sparks when the high voltage signal is generated.
2. The combination of claim 1 wherein the variable delay means is delayably controlled by engine operating signals, RPM, temperature, throttle position and choke position.
3. The combination of claim 1 wherein the apex seals are comprised of ferrous material and the engine housing is comprised of non-ferrous material.
4. The combination of claim 1 wherein the timing sensor is positioned to detect the apex seal when the rotary piston is at the position corresponding to maximum ignition advance.
5. The combination of claim 4 wherein the timing sensor is positioned between the intake and compression chambers.
6. The combination of claim 1 wherein the timing sensor is comprised of a pair of sensors mechanically located in symmetrically opposed relationship about the apex seal detection point.
7. The combination of claim 6 wherein the timing sensor pair is connected in a bridge arrangement to produce an electrical null output at the apex seal detection point.
8. The combination of claim 7 wherein the seal detection point is electrically variable about the mechanical symmetry point.
9. The combination of claim 1 wherein the variable delay means produces a first delayed timing signal and a second delayed timing signal and the spark plugs include a leading spark plug and a trailing spark plug, the leading spark plug being energized in coincidence with the first delayed timing signal, and the trailing spark plug being energized in coincidence with the second delayed timing signal.
10. The combination of claim 1 wherein the high voltage generating means produces multiple high voltage output signals upon activation.

* * * * *